United States Patent
Korupolu et al.

(10) Patent No.: US 12,342,042 B2
(45) Date of Patent: Jun. 24, 2025

(54) SYSTEM AND METHODS FOR PROVIDING AND CONSUMING ONLINE MEDIA CONTENT

(71) Applicant: International Business Machines Corporation, Armonk, NY (US)

(72) Inventors: Chaitanya Korupolu, Visakhapatnam (IN); Girish Padmanabhan, Pune (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 16/403,235

(22) Filed: May 3, 2019

(65) Prior Publication Data
US 2020/0351550 A1 Nov. 5, 2020

(51) Int. Cl.
*H04N 21/442* (2011.01)
*H04N 21/466* (2011.01)
*H04N 21/6587* (2011.01)

(52) U.S. Cl.
CPC . *H04N 21/44218* (2013.01); *H04N 21/44222* (2013.01); *H04N 21/4667* (2013.01); *H04N 21/6587* (2013.01)

(58) Field of Classification Search
CPC ......... H04N 21/44218; H04N 21/4667; H04N 21/44222
See application file for complete search history.

(56) References Cited

U.S. PATENT DOCUMENTS

| | | | | |
|---|---|---|---|---|
| 5,724,987 A | * | 3/1998 | Gevins | A61B 5/16 434/258 |
| 2004/0152060 A1 | * | 8/2004 | Ando | G09B 7/00 434/362 |
| 2005/0181348 A1 | * | 8/2005 | Carey | G09B 7/02 434/350 |
| 2008/0271080 A1 | * | 10/2008 | Gossweiler | H04N 21/4334 725/47 |
| 2008/0276270 A1 | * | 11/2008 | Kotaru | H04N 21/44222 725/34 |
| 2009/0073314 A1 | * | 3/2009 | Uemukai | H04N 5/44513 348/468 |

(Continued)

OTHER PUBLICATIONS

Ali, Syed Imran et al. "An efficient system to identify user attentiveness based on fatigue detection"; International Conference on Information Systems and Computer Networks (ISCON), 2014. pp. 1-5.

(Continued)

*Primary Examiner* — Frank Johnson
(74) *Attorney, Agent, or Firm* — Anthony Curro

(57) ABSTRACT

Methods and apparatus, including computer program products, implementing and using techniques for providing online media content. Online audiovisual media to be displayed to a user is provided to a client device. In response to detecting that the user is inattentive relative to the displayed audiovisual media, the provisioning of the audiovisual media and/or the display of the audiovisual media on the client device are automatically paused. In response to detecting that the user's attention has returned to the audiovisual media, a modified version of the audiovisual media is provided to the client device, to be displayed to the user.

11 Claims, 2 Drawing Sheets

(56) References Cited

U.S. PATENT DOCUMENTS

| | | | |
|---|---|---|---|
| 2010/0064010 A1* | 3/2010 | Alkov | G09B 5/06 709/206 |
| 2013/0047175 A1* | 2/2013 | Ramirez Flores | H04N 21/4223 725/12 |
| 2013/0117248 A1* | 5/2013 | Bhogal | H04N 21/41407 707/705 |
| 2014/0006326 A1* | 1/2014 | Bazanov | G06N 5/02 706/46 |
| 2014/0071342 A1* | 3/2014 | Winograd | H04N 5/44 348/383 |
| 2014/0078039 A1* | 3/2014 | Woods | H04N 21/442 345/156 |
| 2014/0223462 A1* | 8/2014 | Aimone | G16H 40/67 725/10 |
| 2014/0340531 A1* | 11/2014 | Jain | H04N 23/64 348/207.1 |
| 2015/0036999 A1 | 2/2015 | Batur et al. | |
| 2015/0070516 A1* | 3/2015 | Shoemake | H04N 21/44008 348/207.11 |
| 2015/0099255 A1* | 4/2015 | Aslan | G09B 19/00 434/350 |
| 2016/0078369 A1* | 3/2016 | Frank | G06F 3/013 706/12 |
| 2016/0191959 A1* | 6/2016 | Chittella | G06F 40/247 725/32 |
| 2016/0203726 A1* | 7/2016 | Hibbs | G09B 7/02 434/308 |
| 2016/0366203 A1* | 12/2016 | Blong | H04L 65/612 |
| 2017/0039876 A1* | 2/2017 | Alyuz Civitci | G09B 7/00 |
| 2017/0180799 A1* | 6/2017 | Dey | G06K 9/00892 |
| 2017/0243599 A1* | 8/2017 | Hu | H04N 21/44222 |
| 2017/0257669 A1* | 9/2017 | Liu | H04N 21/2668 |
| 2017/0332036 A1* | 11/2017 | Panchaksharaiah | H04N 21/4532 |
| 2018/0012238 A1* | 1/2018 | Giannuzzi | G06Q 30/0203 |
| 2018/0018507 A1* | 1/2018 | Chetlur | G06V 40/176 |
| 2018/0024631 A1 | 1/2018 | Lo | |
| 2018/0077455 A1 | 3/2018 | Mahmoud et al. | |
| 2018/0205990 A1* | 7/2018 | Matthews | H04N 21/278 |
| 2018/0270517 A1* | 9/2018 | Maillot | H04N 21/43072 |
| 2018/0314328 A1 | 11/2018 | Ghajar | |
| 2020/0273485 A1* | 8/2020 | Jagmag | G06Q 30/0631 |

OTHER PUBLICATIONS

Fessenden, Therese, Scrolling and Attention:; Nielsen Norman Group; Fremont, CA; https://www.nngroup.com/articles/scrolling-and-attention; Apr. 15, 2018; 11 pp.

Lagun, Dmitry et al. "Understanding and Measuring User Engagement and Attention in Online News Reading"; WSDM '16 Proceedings of the Ninth ACM International Conference on Web Search and Data Mining, pp. 113-122, 2016.

Shaikh, Faisan, Essentials of Deep Learning—Sequence to Sequence modelling with Attention (using python); https://www.analyticsvidhya.com/blog/2018/03/essentials-of-deep-learning-sequence-to-sequence-modelling-with-attention-part-i/; Mar. 15, 2018. 24 pp.

Yang, Zhongliang et al., "Image Captioning with Object Detection and Localization"; Image and Graphics. ICIG 2017. Lecture Notes in Computer Science, vol. 10667. Springer, Cham, 2017. 10 pp.

* cited by examiner

SYSTEM AND METHODS FOR PROVIDING AND CONSUMING ONLINE MEDIA CONTENT

BACKGROUND

The present invention relates to online media content, and more specifically, to enhanced techniques for providing and presenting online media content to a user in a way that enables the user to absorb the media content more efficiently.

Online media content, such as press, magazines, books, television, radio, etc., that is provided through the Internet gives users an abundance of information that can be used both for learning purposes, entertainment purposes, or for causal reading. Rather than using conventional encyclopedias, current day Internet users often resort to online content in order to understand or gather information about a particular topic.

At the same time, users face significant challenges when viewing streaming online media for learning purposes. For example, users may be interrupted by phone calls, colleagues or friends stopping by, incoming text messages or emails, etc., and these various kinds of interruptions typically cause the users to lose continuity of the media content, and makes it more difficult to absorb the information.

It is often difficult for the user to resume the learning at the point where she was interrupted. Furthermore, in many cases the user may have difficulties recalling the previously viewed content and needs to backtrack and revisit sections that the user already had viewed or listened to. Thus, there is a need for improved techniques for presenting online media content to a user in a way that enables the user to absorb the media content more efficiently and that can mitigate the effects of undesired and unplanned interruptions.

SUMMARY

According to one embodiment of the present invention, methods, systems and computer program products are described for providing online media content. Online audiovisual media to be displayed to a user is provided to a client device. In response to detecting that the user is inattentive relative to the displayed audiovisual media, the provisioning of the audiovisual media and/or the display of the audiovisual media on the client device are automatically paused. In response to detecting that the user's attention has returned to the audiovisual media, a modified version of the audiovisual media is provided to the client device, to be displayed to the user.

The details of one or more embodiments of the invention are set forth in the accompanying drawings and the description below. Other features and advantages of the invention will be apparent from the description and drawings, and from the claims.

DETAILED DESCRIPTION

Figure 1:
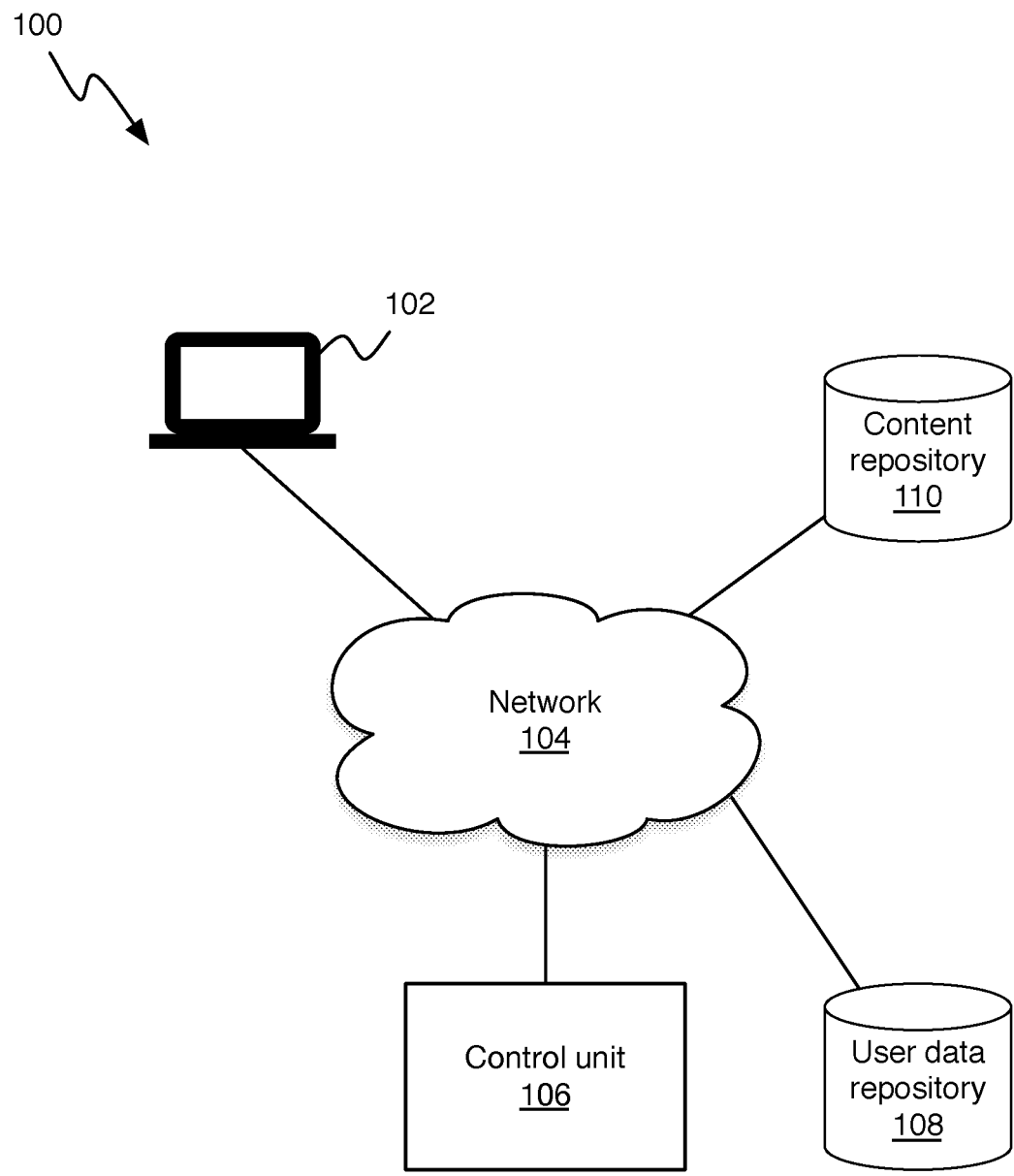
FIG. 1 is a block diagram showing a system for viewing online media content, in accordance with one embodiment.

The various embodiments of the invention pertain to techniques for providing and presenting online media content to a user in a way that enables the user to absorb the media content more efficiently. In various embodiments, this can be accomplished using one or more of the following techniques.

One technique involves maintaining continuity for the user by automatically stopping streaming media content, such as video and subsequently rewinding and/or playing a summary of a portion of content missed by the user due to one or more distraction factors, such as phone call, a person coming over to talk to the user, losing network connection, etc. The automatic stopping, rewinding or playing of a summary portion can be initiated, for example, by detecting a change in the user's facial expression and/or body language, which may indicate a shift of focus away from the media that the user is currently watching. Conversely, it can be detected when the user's focus shifts back to the media. Various combinations of these actions can result in the media pausing, auto-rewinding to the point where the user lost focus, or playing a summary of the media content that was playing while the user was not focusing on the content, upon the user's focus returning to the media. Which of these actions will occur can be determined, either by the user or by the provider of the media content. It should be noted that while "media" in this application refers primarily to visual media, such as video or slide shows, the same general concepts can also be applied to audio media or even to textual content.

A user's facial and body language may also indicate a focus shift by user. For example, if a user yawns, it may indicate that the user is tired and has a difficult time focusing. Eye movements of the user may indicate confusion or that the user not having understood the contents, and so on.

Another technique for keeping the user's attention to media that is currently being watched involves identifying a user's topics of interest from different sources (such as social media, for example) and providing embedding meaningful content from such sources into the currently playing media, in order to entice the user to return her focus back to the currently playing media. For example, assume the user is watching an online video on the topic of blockchains, and there is also a live football game going on. From social networking data and previous social media postings made by the user, the system can infer that the user likely is a big fan of one of the teams playing in the football game. Now, if it is detected that the user starts to lose her attention on the blockchain video, the system can interrupt the blockchain video and instead show the live football game to the user. Typically, the live game is shown to the user for a short period that can be either fixed or that can be determined by detecting when the user is sufficiently engaged to resume the blockchain video, for example, when the user has found out the score of the game and is no longer distracted by the need to know what is happening in the game. Again, this detection can happen using the facial and or body language techniques discussed above.

Another technique involves identifying portions of a video, of which user is already aware (for example, based on the user's area of expertise, prior content viewing, etc.) and either skipping such portions from the currently playing media or simply playing a summary of such portions. The identification of such portions can be made, for example, by an analytical engine that can identify and track previously learned materials by the user, and/or social and personal likes and dislikes, etc.

Further, if the online media content is used for learning purposes, it can be altered based on a user's abilities, such as learning style, learning capability, etc. For example, textual content can be played back to the user as audio content instead, or conversely, audio or video content can be converted into textual content. Other example of adapting content includes displaying subtitles to the user or asking intermediate questions on played content in order to keep the user's focus.

Yet another technique involves identifying the portion of media and the user's actions, such as categorizing the media as "favorite," adding the media to a playlist and/or pausing the media and seeking clarification on external avenues (e.g., social or peer groups) on a portion of content. These actions are understood by the system and allows the system to provide recommendations, suggestions, inferences and/or references to other media content that may further enhance the user's learning experience and make it even more effective.

Various embodiments will now be described in further detail by way of example and with reference to the figures. The illustrative example used herein will refer to an online learning system. However, it should be noted that various embodiments of the invention can be applied in a number of different settings.

For example, in one embodiment, a user might be watching an online news channel on their television set. While watching, the user notes that everybody is sending congratulatory messages to a certain Mr. Critical, who is a head of a government organization. The user gets a surprised look on his face, as it is highly unusual for Mr. Critical to be congratulated and the user does not understand why Mr. Critical is all of a sudden being congratulated by so many people. The system may pick up the user's expression of surprise and as a response embed a video of a successful rocket launch as part of a Space program headed by Mr. Critical. That would give the user the complete context and a better understanding about why Mr. Critical is receiving so many congratulatory messages all of a sudden. That is, the user would be able to relate to the news in a better way by having this additional contextual information.

In another embodiment, a user may be reading an online article (or watching online media) about a how a medical condition, say, for example, "tennis elbow" (lateral epicondylitis) is affecting more and more people and how it best should be treated. The user, while reading the article or viewing the media, may not be aware of what "tennis elbow" is and why this condition is getting so much attention. The system could capture and interpret the user's confused look and inform the user that this was the same problem that had previously bothered cricket player Sachin Tendulkar, and caused him a bad patch in his career. With this additional information at hand, the user might be able to better relate to the article on the treatment of tennis elbow.

Turning now back to the example of online learning, FIG. 1 shows a block diagram of a system 100 for viewing online media content, in accordance with one embodiment. As can be seen in FIG. 1, the system 100 includes a client device 102 that is configured to display the online media content received by the client device 102 to the user. The client device 102 can be any type of device that includes a processor and a display, preferably in combination with audio capabilities, to display online content. Some examples include desktop computers, laptops, tablets, phones, TVs, etc.

In order for the system to be able to detect when a user loses focus on the audiovisual media that is being displayed, the client device 102 is also preferably equipped with a camera that is configured to capture images or video of the user as the user watches the content on the display of the client device 102. Although the camera is typically built into the client device 102, it should be noted that there are also embodiments in which a freestanding digital camera may be used to capture images or video of the user. Such a freestanding camera can be connected to the client device 102, or communicate directly with the remainder of the system 100 through a wired or wireless connection, or a combination thereof.

The system 100 further includes a network 104 that connects the client 102 to other components of the system. The network 104 can be any type of wired or wireless network, and various combinations thereof, and can include both intranets, and the Internet.

Connected to the network 104 is also a control unit 106. As will be described in further detail below, the control unit 106 receives images captured by the camera on the client device 102, and analyzes the content of the images to detect whether the user has lost her focus on the media that is being displayed. Based on the result of the analysis, the control unit 106 determines whether to suspend the provisioning of media to the client device 102, or finds alternative ways in which to provide media to the client device 102, as will be described in further detail below. It should be noted that while the control unit 106 is illustrated in FIG. 1 as being a networked device, in some embodiments, it may be part of the client device 102.

The system 100 also includes a user data repository 108, which contains user data, such as the users' viewing history and preferences, and previously captured images of users that may be used by the control unit 106 as a reference to determine whether a user is losing or resuming her focus, etc., on the media being displayed on the client device 102. It should be noted that these are merely a few examples and that there can be many other types of user data included in the user data repository 108.

The system is further connected to a content repository 110, from which media content can be retrieved and provided to the client device 102, in response to instructions received from the control unit 106. It should be noted that while only a single content repository 110 is illustrated in FIG. 1, media content can generally be accessed from essentially any provider on the Internet, and is not limited to a particular content repository 110, unless such limitations have been imposed for specific purposes by a system administrator.

Figure 2:
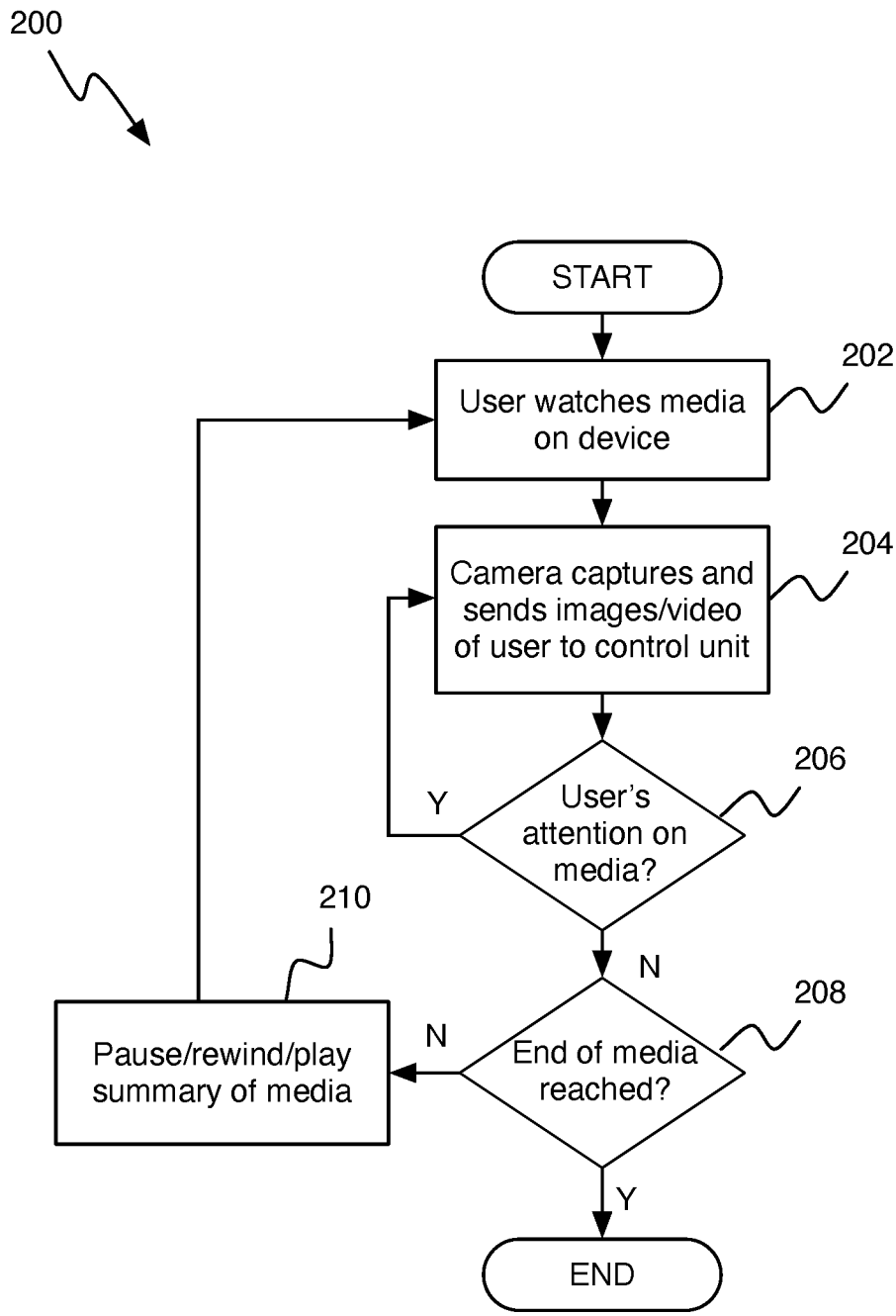
FIG. 2 is a flowchart showing a method for viewing online media content, in accordance with one embodiment Like reference symbols in the various drawings indicate like elements.

Turning now to FIG. 2, a method 200 for viewing online media content, in accordance with one embodiment will now be described. In the following description, the method will be described in general terms, and at the end, specific use scenarios will be discussed in more detail. As can be seen in FIG. 2, the method starts with a user selecting some type of online media to watch on the client device 102, step 202. Typically, the user selects the media through a browser interface on the client device 102 and the media is retrieved from the content repository 110. It should be noted, however, that other selection mechanisms are also possible, or that the user can be provided with media that she is required to watch, for example, as part of an online course or other educational program.

As the user watches the content on the client device 102, a camera captures images of the user and sends them to the control unit 106 over the network 104, step 204. The images can be captured at various time intervals, for example, every few seconds, or can be captured as a continuous video stream. In some embodiments, the camera is focused on the user's face only, to capture changes in the user's facial expression. In other embodiments, the camera may also include parts of the users body in order to capture changes in the user's body language.

It should be noted that in order to record pictures and/or video of the user, the user typically must consent prior to using the system 100. Typically, the user is informed that the tracking is solely provided in order to give a better user experience and service. Typically, the user will have an option to enable/disable the recording at any point in time, for example, through a simple click or a voice controlled instruction or a gesture. The user can also be informed that any pictures or video will be discarded after it has been used to determine the state of the user's attention. Alternatively, all recorded information can be returned to the user such that the user can discard it themselves. Thus, there are many possibilities for addressing any issues relating to the user's privacy.

The control unit 106 processes the images to determine whether the user's attention is focused on the media, step 206. The processing includes, among other things, analyzing the images to determine the user's behavior, frame of mind, attention indicator and focus shift. Many prototype systems and studies have been developed to address these issues. A few examples can be found on the following websites:

https://www.nngroup.com/reports/how-people-read-web-eyetracking-evidence/?lm=scrolling-and-attention&pt=article https://www.nngroup.com/articles/scrolling-and-attention/ https://ieeexplore.ieee.org/abstract/document/6965210/ https://www.analyticsvidhya.com/blog/2018/03/essentials-of-deep-learning-sequence-to-sequence-modelling-with-attention-part-i/ and in the following papers:

"An efficient system to identify user attentiveness based on fatigue detection" by Syed Imran Ali et al., International Conference on Information Systems and Computer Networks (ISCON), 2014.

"Image Captioning with Object Detection and Localization" by Zhongliang Yang et al., Image and Graphics. ICIG 2017. Lecture Notes in Computer Science, vol. 10667. Springer, Cham, 2017.

"Understanding and Measuring User Engagement and Attention in Online News Reading" by Dmitry Lagun et al., WSDM '16 Proceedings of the Ninth ACM International Conference on Web Search and Data Mining, Pages 113-122, 2016.

It should be noted that even though individuals may exhibit different behaviors when they lose attention or get distracted, there are also many common behaviors, such as blinking their eyes too often, rubbing their eyes, cracking their knuckles, stretching their arms, moving their eyes away from screen, or moving their eyes in reaction to an external distraction, such as the sound of a door bell, traffic noise, etc. Such factors are typically easy to detect and may help identify whether the user's focus has shifted away from the media being presented on the display of the client device 102.

In addition, in order to further enhance the determination about the user's attention, in some embodiments, the control unit 106 can refer to previously recorded images of the user, which have been tagged (for example, as "attentive" or "inattentive") and saved in the user data repository 108, with the user's permission. This allows an individual determination of the attention level for the particular user, and does not solely rely on the general indicators discussed above, and may thus produce more reliable results about the user's attention and provide a better user experience.

If the control unit 106 determines that the user is inattentive to the media in step 206, then the control unit 106 proceeds with determining whether the end of the media presentation has been reached, step 208. If the end of the media presentation has been reached, the process ends and the camera stops capturing images/video of the user.

If it is determined in step 208 that the end of the media presentation has not been reached (and the user is inattentive to the media), the control unit 106 suspends the media provision and the display of the media until the user's attention returns to the media presentation, step 210. At that point, the presentation is either rewound and resumed at the point in time where the user was determined to have lost attention. Alternatively, using educational media content as an example, the control unit 106 can determine that the user has sufficient knowledge of the missed content, or that the content was not very important, that only a quick summary of the missed content is played, or that the content is not replayed in any form at all. When the media resumes, the process returns to step 202, and continues as described above until the end of the media presentation has been reached.

Exactly what operation that occurs in step 210 may depend on a number of factors. For example, the data in the user data repository 108 may indicate that the user has previously viewed significant amounts of content about the same or a similar topic, then some sections of the media may be skipped. For example, assume a user who has just started to view a video about "Blockchains," and then gets interrupted by somebody knocking on her door, which causes the playback of the video to pause. If the system determines (for example, from data in the user data repository 108) that the user had seen another video covering the basics concepts of blockchains, then in the current video the introduction section on keywords may be skipped, or a simple summary could be run instead of playing the entire introductory section.

Another situation can take into account the user's previous actions with the video. For example, if the user prior to the interruption has paused the media several times to read the text a bit slowly, or if the images recorded of the user indicates that the user looks confused, then it could be inferred that the user has a difficult time understanding the content. In such a situation, it would be inappropriate to play a quick summary, and would instead be recommended to rewind the media to the point where the user's attention got lost, and perhaps even a bit further. In some embodiments, the system might even pause the media automatically at regular intervals to allow the user to digest the content at a slower pace. These are merely some examples of factors that may influence what action the system takes in response to the user losing her attention to the media that is being played. Many other variations can be envisioned by those having ordinary skill in the art.

In some embodiments, it is possible for the system to gauge how well the user has understood the displayed material, for example, based on the user's facial expression, or actions taken by the user, such as joining a chat or searching the web for clarification on concepts used in the displayed video. If the control unit 106 concludes that it is likely that the user has difficulty understanding the material, alternative media can be selected from the content repository 110 by the control unit 106. This alternative media can be selected, for example, based on the user's previously documented ability to understand similar content, the user's past viewing history, the user's preferred mode of communication (text, audio, etc.). The alternative media may also have content that is easier for the user to understand. For example, instead of an "Advanced Concepts in Blockchain" video, the system would suggest a "Blockchain for Dummies" video, which contains the same concepts, but explains them using simpler language.

In some embodiments, in response to detecting that a user keeps losing her attention repeatedly, the control unit 106 can present the user with alternative ways of learning the material presented in the media. Such a decision can be made, for example, based on the type of media the user prefers to watch. For example, one user may prefer to listen to audio books while relaxing on his couch, whereas another user may always prefer text-based content because there is music always playing in the user's background environment.

In order to further illustrate the use of the system and learning techniques described above, please consider the following exemplary use scenarios:

Exemplary Use Scenario #1: E-Learning

Assume a user is watching an online video on the topic of blockchains. The video is a basic introduction on the topic, but the topic is new to the user and is also complex, so the user has a difficult time understanding what is being explained. As the video progresses, the user gets bored and sleepy and loses continuity of the video. At the same time, there is an Indian Premiere League (IPL) match currently in progress. As the user is a big fan of cricket, she is very interested in knowing how the match is progressing. In this situation a few possible scenarios may occur:
1) The control unit 106 can pause the video and instead embed live streaming of the IPL match for a few minutes. This would likely reduce the user's boredom, since she would start concentrating on the match. Once the live streaming of the IPL match stops and the video on blockchain resumes, the user will be more alert and be in a better position to grasp the content being shown.
2) The user's facial and body language might indicate inattention. For example, the user might be yawning, or the focus of her eyes might very frequently be shifting away from the blockchain video that is played, etc. The control unit 106 can detect these and more signs that indicate a shift in attention and identify the portion of the video that was probably not understood by the user, and rewind the video to replay that portion to the user.
3) If the part of the video that was not understood or ignored by the user is not very critical to the rest of the content, the control unit 106 can provide a quick summary of that portion to be played by the client device 102. This could help the user to get up to speed for the next section, which may contain more important materials.
4) If the user is reading an e-book, the control unit 106 upon detecting that the user is losing focus on the topic, could start playing an audio version of the e-book, which might be better to get the user's attention.
5) If the control unit 106 detects the current video is not proving to be useful to the user, because the user is unable to concentrate due to multiple reasons, it can recommend a different and simpler video, e-book, or audio recording on the same topic. In some cases, the recommendations may also contain more interactive elements and be easier to comprehend.
6) The system may detect that the user has been reading about blockchains via other sources online (e.g., by examining the user's social feeds), and while going through those sources detect that she had a good concentration span and most likely has understood the topic very well. In such a scenario, the control unit 106 may decide not to repeat the missed portion by the user, and proceed to the next topic, which may be on bitcoin, for example. Alternatively, the system could plan a concise version of blockchain, just to get the user connected to the video and then progress to the topic on bitcoin.

Exemplary Use Scenario #2: Assessment-Based Training

Assessment Based Courses ("ABC") is a type of self-paced e-learning programs, which may cover a wide range of subjects and interest areas. One characteristic of ABC's is that they typically involve a number of self-study modules, which include multimedia files, and that there is an end-of-module assessment test requiring a pass rate of something like 70% or above in order to advance to the next module.

Often users do not go through the entire module, under the assumption that they are already very familiar with the topic, and instead proceed directly to the end-of-module assessment test. When answering the questions in the assessment test, the following scenarios may occur:
1) The user tries her luck, by randomly selecting answers on multiple-choice questions.
2) The user asks for help from friends who have already taken the assessment.
3) The user re-takes the training module and assessment, this time selecting different options for the questions that she answered incorrectly.

Irrespective of which one among the above scenarios occurs, the main objective of educating the user is not met.

By instead using various embodiments of the invention to identify that the user is not concentrating on the content, for example, through examining the users expressions, body language and eye movements, the user can be redirected to the parts she skipped. These parts typically correlate with a gap in the user's knowledge. Similarly, the user can skip the parts that she already knows. As a result, the user stays more engaged, and the learning process can be more efficient. In situations where time is of essence, for example, in a corporate environment, being able to educate employees more efficiently can also benefit the company in various ways.

Exemplary Use Scenario #3: Stock Trading

Assume a user is interested in stock trading and is going through a current market analysis on a stock and its trend on various platforms, such as financial websites, in order to make herself familiar with new stock trading terminology (e.g., P/E Ratio, Face value, Book value, Dividend yield, and so on). The user then joins a e-trading platform offered by her bank, but discovers that the terminology used in that e-trading platform is different from what she learned earlier. As a result, the user finds it difficult to use her bank's e-trading platform and reaches out to some of her friends for information on the terminology used in the bank's e-trading platform. A couple of scenarios may occur:
1) The control unit 106 could direct the user to a bookmarked link explaining that the term referred to by the bank e-trading platform is the same as the term she learned in the online course on trading.
2) The control unit 106 could identify that the user has switched to a chat tool to check with someone about the terminology used in the e-trading platform, and the system could instead point the user to one or more bookmarked links.

This is another example of a way in which detecting a user's behavior can be used to enhance the user's learning or understanding of various concepts.

It should be noted that while the above techniques have been described in the context of the Internet, they may also be applied within an Intranet or a "stand alone" system that is not networked. Such implementations may be particularly useful when the media content is confidential and should not be shared publicly outside a particular organization.

Further, in some embodiments audio can also be recorded to enhance to improve the functioning of the system 100 and to resolve potentially ambiguous situations. For example, if the user looks away from the screen briefly and the system 100 cannot with complete certainty determine whether the user is distracted, a more accurate decision could be made if the system 100 also had registered a loud noise at the time the user took her eyes away from the screen of the client device 102.

Yet further, it should be noted that while the above operations have been described as automatically pausing both the provisioning of the audiovisual media and pausing the display of the audiovisual media on the client device, there may be embodiments in which the provisioning of the audiovisual media continues, and it is only the display on the client device that is paused. In some implementations, the decision about what modified version of the content to provide to the client could be made by the provider of the audiovisual media content, rather than the control unit 106. Thus, many variations can be envisioned by those having ordinary skill in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing online media content in an online learning setting, comprising:
    providing online audiovisual media, to a client device, to be displayed to a user in an online learning setting;
    detecting multiple times by a computing device an attention level of the user in the online learning setting, the attention level in the online learning setting detected by comparing previously recorded images of the user tagged as attentive or inattentive to previous online learning settings with a current image of the user in the online learning setting;
    in response to detecting by the computing device that the user keeps losing his or her attention in the online learning setting repeatedly by comparing previously recorded images of the user in previous online learning settings with the current image of the user in the online learning setting, making a determination regarding an alternative means of learning material to present to the user in the online learning setting, the alternative means a preferred means of learning based on a type of media the user prefers in learning; and
    providing a modified version of the audiovisual media via the client device to the user by substituting audiovisual media with audio content, video content, or text content based on the preferred means of learning of the type of media the user prefers.

2. The method of claim 1, wherein detecting that the user is inattentive and attentive relative to the displayed audiovisual media in the online learning setting further includes:
    recording, by the client device, images or video of the user while the user watches the audiovisual media in the online learning setting; and
    examining the recorded images or video to identify body language of the user that indicates attention or loss of attention in the online learning setting.

3. The method of claim 1, wherein the user consents to have his or her image used by the computing device.

4. A computer program product for displaying online media content while keeping a user's attention, the computer program product comprising a computer readable storage medium having program instructions embodied therewith, wherein the computer readable storage medium is not a transitory signal per se, the program instructions being executable by a processor to cause the processor to perform a method comprising:
    providing online learning audiovisual media to a client device, to be displayed to a user;
    in response to detecting multiple times that the user is inattentive relative to the client device displaying the online learning audiovisual media in the online learning setting, an attention level detected by comparing previously recorded images of the user tagged as attentive or inattentive to previous online learning settings with a current image of the user in the online learning setting, automatically pausing the provisioning of the online learning audiovisual media and pausing the display of the audiovisual media on the client device;
    identifying a topic of interest for the user, the topic of interest not related to the online learning setting;
    presenting to the user via the client device audiovisual media related to the topic of interest for the user to encourage the user to return attention to the client device; and
    in response to detecting that the user's attention has returned to the client device, providing a modified version of the audiovisual media in the online learning setting to the client device, to be displayed to the user, the modified version providing a section of the audiovisual media in the online learning setting that was displayed during a time the user was inattentive or providing a summary of the section of the audiovisual media in the online learning setting that was displayed during the time the user was inattentive.

5. The computer program product of claim 4, wherein the instructions being executable by the processor further causes the processor to:
    make a decision about identifying the topic of interest for the user based on one or more of: prior social networking data, the user's area of expertise, and the user's prior content viewing.

6. The computer program product of claim 4, wherein providing a modified version of the audiovisual media includes one or more of:
    providing a modified type of audiovisual media including substituting the audiovisual media with audio content or video content, and
    providing audiovisual media having a modified level of difficulty making it easier to absorb information.

7. The computer program product of claim 6, wherein the substitution is made in response to a determination relating to the user's preferred learning style.

8. The computer program product of claim 6, wherein providing audiovisual media having a modified level of difficulty includes substituting the audiovisual media with one of: audiovisual media covering more advanced content, and audiovisual media covering less advanced content.

9. The computer program product of claim 8, wherein the substitution is made in response to a determination relating to the user's learning capabilities and skill level.

10. The computer program product of claim 4, wherein detecting that the user is inattentive and attentive relative to the displayed audiovisual media further includes:
   recording, by the client device, images or video of the user while the user watches the audiovisual media; and
   examining the recorded images or video to identify body language of the user that indicates attention or loss of attention.

11. The computer program product of claim 4, wherein the user consents to have his or her image used.

* * * * *